United States Patent Office 3,576,021
Patented Apr. 20, 1971

3,576,021
BIS-SILYLFLUOROALKYLAROMATIC
COMPOUNDS
George A. Grindahl, Midland, Mich., assignor to Dow
Corning Corporation, Midland, Mich.
No Drawing. Filed Feb. 20, 1969, Ser. No. 801,203
Int. Cl. C07f 7/08, 7/18
U.S. Cl. 260—448.2
6 Claims

ABSTRACT OF THE DISCLOSURE

Bis-silyl compounds of the general formula

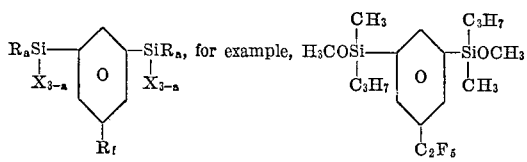

are hydrolyzed and condensed to produce polymers from which heat-stable polymers can be formulated.

---

This invention relates to bis-silylfluoroalkylaromatic compounds. In one aspect, the invention relates to fluoroalkyl-substituted silphenylene polymers.

The bis-silyl compounds of the invention are of the general formula (I) 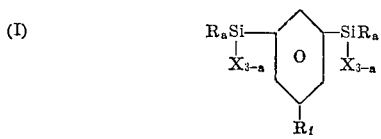

in which

X is the hydroxy group or a hydrolyzable radical;
R is the hydrogen atom, a monovalent hydrocarbon radical, a monovalent halohydrocarbon radical, or a beta-perfluoroalkylethyl radical;
$R_f$ is a perfluoroalkyl radical or no more than 20 carbon atoms; and
$a$ is an integer having a value of from 0 to 2.

These bis-silyl compounds can be polymerized to provide siloxanes having at least one unit of the formula (II) 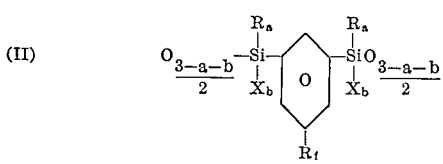

in which
X, R and $R_f$ are as defined above;
$a$ has a value of 0 to 2;
$b$ has a value of 0 to 3, the sum of all $a$ and $b$ values being no greater than 5;
any remaining siloxane units being of the formula $$Z_c SiO_{\frac{4-c}{2}}$$

Z is the hydrogen atom, the hydroxy or a hydrolyzable group or an organic radical attached to the Si atom through an Si—C linkage; and
$c$ has a value of from 0 to 3 inclusive.

In the compositions and polymers of this invention, X can be any hydrolyzable group such as halogen atoms; such as fluorine, chlorine, and bromine; hydrocarbonoxy groups such as methoxy, ethoxy, octadecyloxy, allyloxy, cyclohexyloxy, phenoxy, tolyloxy, benzyloxy, $-OCH_2CH_2OCH_3$ and $-(OCH_2CH)_3OC_2H_5$
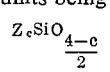

acyloxy groups such as acetoxy, propionyloxy, benzoyloxy, cyclohexyloxy, and

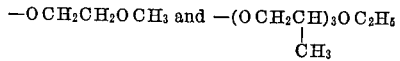

ketoxime groups such as

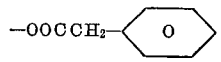

amine groups such as

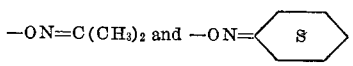

sulfide groups such as

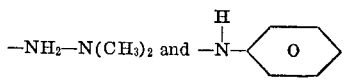

the nitrile group, the isocyanate group, sulfate groups such as

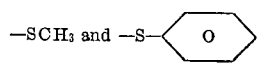

carbamate groups such as $—OOCNHCH_3$, $—OOCN(CH_3)_2$ and $—OOCN(C_2H_5)_2$ and groups such as $—ON(CH_3)_2$ and $—ON(C_3H_7)_2$. "Hydrolyzable group" as used in this specification is defined as a group which is removed from the silicon atom by reaction with water at room-temperature.

R can be any monovalent hydrocarbon radical, such as alkyl radicals, for example, methyl, ethyl, isopropyl, t-butyl, octadecyl, myricyl; cycloaliphatic radicals, for example, cyclohexyl, cyclopentyl and cyclohexenyl; aromatic hydrocarbon radicals, for example, phenyl, xenyl and naphthyl; aralkyl hydrocarbon radicals such as benzyl, beta-phenylethyl and beta-phenylpropyl; and alkenyl radical, for example, vinyl, allyl, hexenyl, butadienyl or other unsaturated groups including $CH\equiv C—$. When R is an unsaturated group it is best to add it to the silicon subsequent to the formation of the bis-silyl structure. This can be done, for example, by reacting an unsaturated Grignard reagent (i.e. vinyl magnesium bromide) with $\equiv SiCl$. The same or different R groups can be attached to the same silicon atom.

R can also be any beta-perfluoroalkylethyl radical or the formula $R'CH_2CH_2—$ in which R' is a perfluoroalkyl radical such as

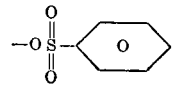

In addition, R can be any halohydrocarbon radical in which the halogen is Cl, Br or I, such as chloromethyl, gamma-chloropropyl, bromo-octadecyl, chlorocyclohexenyl, 3-chlorobutenyl-4, chlorophenyl, bromoxenyl, tetrachlorophenyl, p-chlorobenzyl, trichloropropyl and iodophenyl.

The $R_f$ radical can be any suitable perfluoroalkyl radical for example

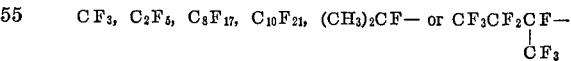

and

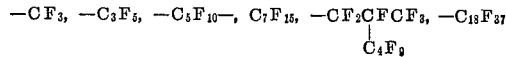
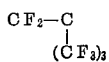

including a perfluorocycloaliphatic radical such as

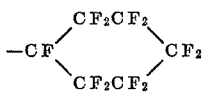

The $R_f$ radical generally contains no more than 20 carbon atoms.

The following are illustrative of the bis-silyl compounds of the invention:

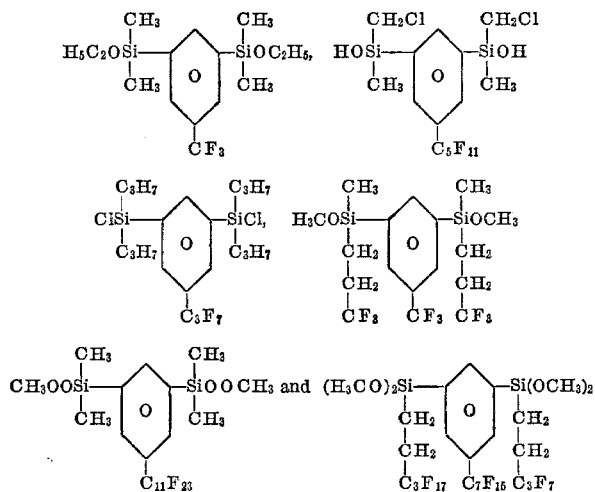

The bis-silyl compounds are most easily prepared by reacting a mixture of (1) magnesium, (2) a chlorosilane of the formula $ClSiR_aX_{3-a}$, (3) a dibromobenzene compound containing an $R_f$ substituent in tetrahydrofuran as a solvent. The magnesium, in the form of turnings, and tetrahydrofuran can be placed in a reaction vessel and when a mixture of (2) and (3) is added, the reaction is spontaneous without heating. The reaction is highly exothermic and the reaction temperature is controlled by the addition rate.

The silanols of the invention (i.e. where X is the hydroxy group) are best prepared by hydrolyzing the corresponding hydrolyzable silanes under neutral conditions by any of the methods well-known in the art. The preferred method of silanol preparation is by hydrolysis of those compounds in which X is an alkoxy group.

The siloxanes of the invention can be prepared by partial or complete hydrolysis of the above defined silanes by conventional means, or by cohydrolysis of the above silanes with silanes of the formula

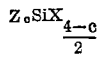

where Z, X and c are as defined above. The particular method chosen for the hydrolysis or cohydrolysis can vary widely depending upon the nature of the substituent groups on the silicon atom. Thus, there are no critical conditions other than the well-known methods for hydrolyzing and cohydrolyzing silanes.

As described above, the siloxanes can be homopolymers or they can be copolymers. The copolymeric siloxanes of the invention can contain soloxane units of the formula

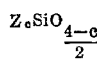

where c has a value of from 0 to 3 inclusive. These units are of the type: $SiO_2$, $ZSiO_{3/2}$, $Z_2SiO$ and $Z_3SiO_{1/2}$. The same or different Z groups can be bonded to the same silicon atom.

Z can be a hydrogen atom, a hydroxyl group, any of the above defined hydrolyzable groups (X) or an organic radical attached to the silicon through an Si—C linkage; such as any of the monovalent hydrocarbon radicals specifically shown for R above; divalent hydrocarbon radicals, for example, methylene, dimethylene,

—CH₂CH=CHCH₂— and octadecamethylene; arylene radicals, for example, phenylene, xenylene, tolylene, xylylene and naphthylene; and cycloalkylene radicals such as cyclohexylene and cyclopentylene. Z can also be any halohydrocarbon radical, such as described with respect to R or the above described R′CH₂CH₂— radical.

Also included within the scope of the invention are siloxanes as described above which have olefin-containing siloxane units, such as

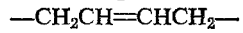

The methylvinylsiloxane units are expecially preferred. These olefin-containing siloxane units are usually present in amount in the range of from 0.1 to 10 mole percent to provide crosslinking sites in the elastomeric materials.

Illustrative of the copolymers of the invention are

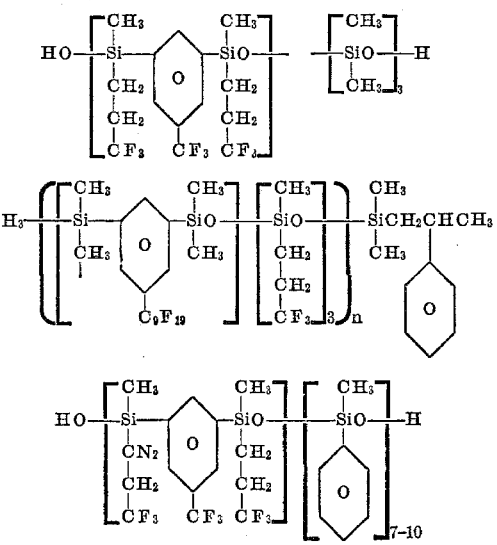

Depending upon the degree of polymerization, the siloxanes of the invention are fluids, resins and elastomeric materials. The resin forms a hard film and can be used as a coating composition. The elastomers have particular utility as sealants in high temperature environments and have a high resistance to degradation upon exposure to radiation and the fluids are useful as lubricants.

The following examples are illustrative of the invention which is delineated in the claims.

EXAMPLE 1

A mixture of 95 grams of 3,5-dibromobenzyltrifluoride and 138 grams of 3,3,3-trifluoropropylmethylethoxychlorosilane was added to a reaction flask containing 16.54 grams of magnesium and 200 milliliters of tetrahydrofuran. The reaction was spontaneous at 30° C. and cooling was required to maintain the reaction temperature at 40–50° C. during the two hour period of addition of reactants. When addition was complete, the reaction mixture was heated briefly to 55° C., cooled and filtered. The salts were washed with tetrahydrofuran.

The filtrate and wash solution were combined and distilled. The distillate was fractionated to yield 20 grams of 3,5 - bis(3,3,3-trifluoropropylmethylethoxysilyl)benzyltrifluoride.

*Analysis.*—Calculated for $C_{19}H_{27}F_9O_2Si$ (percent): C, 44.35; H, 5.29; F, 33.23; Si, 10.92. Found (percent): C, 44.8; H, 5.25, 5.34; F, 32.6; Si, 10.32.

[1] H NMR was in agreement with the structure.

EXAMPLE 2

A solution of 24.2 grams of 3,5-bis(3,3,3-trifluoropropylmethylethoxysilyl)benzyltrifluoride in 60 milliliters of ether was added to flask containing 100 milliliters of water and 5 milliliters of glacial acetic acid. The solutions were stirred for 48 hours, after which the ether phase was separated and stripped of solvent. The residue was recrystallized from hot chloroform to yield 14 grams of 3,5 - bis(3,3,3 - trifluoropropylmethylhydroxysilyl)benzyltrifluoride which had a melting point of 124–127° C.

*Analysis.*—Calculated for $C_{15}H_{19}F_9O_2Si_2$ (percent): C, 39.29; H, 4.18; F, 37.30; Si, 12.25; OH, 7.58. Found (percent): C, 39.0, 39.4; H, 4.13; F, 37.1; Si, 12.3; OH, 7.58.

EXAMPLE 3

A mixture of 11.4 grams of 3,5-bis(3,3,3-trifluoropropylmethylhydroxysilyl)benzyltrifluoride, 100 milliliters of toluene (solvent) and 5 drops of tetramethylguanidine acetate in acetic anhydride (catalyst) was refluxed for 30 minutes to yield the theoretical amount of water evolved by condensation. An additional four hours under reflux conditions failed to yield any water.

The solvent was removed by distillation at reduced pressure to yield 9.2 grams of polymer from the reaction. The polymer was of the formula

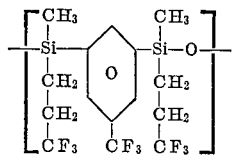

The polymer was a clear, colorless elastomeric gum. When heated at a rate of 17° C./minute, the polymer exhibited a 10 percent weight loss at 390° C. in air and 430° C. in nitrogen. The polymer was soluble in ether and acetone but insoluble in toluene and benzene.

EXAMPLE 4

When a mixture of the bis-silyl product of Example 2 and a hydroxyl-endblocked linear dimethylpolysiloxane is cocondensed by the method described in Example 3, a copolymer of the following structure is obtained:

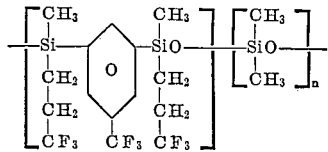

Reasonable modification and variation are within the scope of the invention which sets forth novel bis-silyl compounds and polymeric products prepared therefrom.

That which is claimed is:

1. A compound of the general formula

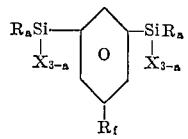

in which

X is the hydroxy group or a hydrolyzable radical;
R is the hydrogen atom, a monovalent hydrocarbon radical, a monovalent halohydrocarbon radical or a beta-perfluoroalkylethyl radical;
$R_f$ is a perfluoroalkyl radical of no more than 20 carbon atoms; and
$a$ is an integer having a value of from 0 to 2.

2. A compound in accordance with claim 1 wherein $R_f$ is a trifluoromethyl radical.

3. A compound in accordance with claim 1 consisting essentially of 3,5 - bis(trifluoropropylmethylethoxysilyl) benzyltrifluoride.

4. A compound in accordance with claim 1 consisting essentially of 3,5-bis(trifluoropropylmethylhydroxysilyl) benzyltrifluoride.

5. A siloxane having at least one unit of the formula

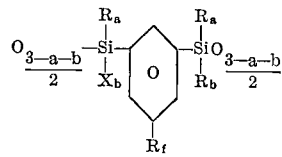

in which

X is the hydroxy group or a hydrolyzable radical;
R is the hydrogen atom, a monovalent hydrocarbon radical, a monovalent halohydrocarbon radical or a beta-perfluoroalkylethyl radical;
$R_f$ is a perfluoroalkyl radical of no more than 20 carbon atoms; and
$a$ has a value of from 0 to 2; and
$b$ has a value of from 0 to 3, the sum of all $a$ and $b$ values being no greater than 5;
any remaining siloxane units being of the formula

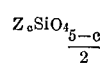

in which

Z is the hydrogen atom, the hydroxy or a hydrolyzable group or an organic radical attached to the Si atom through an Si—C linkage; and
$c$ has a value of from 0 to 3 inclusive.

6. A siloxane polymer consisting essentially of units of the formula

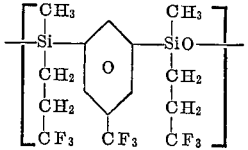

References Cited

UNITED STATES PATENTS

| | | | |
|---|---|---|---|
| 2,499,561 | 3/1950 | Barry | 260—448.2D |
| 2,628,242 | 2/1953 | Clark | 260—448.2D |
| 2,709,692 | 5/1955 | Gainer | 260—46.5P |
| 2,739,638 | 3/1956 | Lewis et al. | 260—448.2DX |
| 3,334,120 | 8/1967 | Holbrook et al. | 260—448.2D |

TOBIAS E. LEVOW, Primary Examiner

P. F. SHAVER, Assistant Examiner

U.S. Cl. X.R.

252—49.6; 260—37, 46.5P, 448.2R